United States Patent
Moons et al.

(10) Patent No.: US 9,802,266 B2
(45) Date of Patent: Oct. 31, 2017

(54) WELDING TORCH SYSTEM FOR USE IN WELDING OR CUTTING OPERATIONS, WELDING TORCH FOR USE IN SUCH A WELDING TORCH SYSTEM AND METHOD FOR WELDING USING SUCH A WELDING TORCH SYSTEM OR SUCH A WELDING TORCH

(71) Applicant: Nederlandse Organisatie voor toegepast-natuurwetenschappelijk onderzoek TNO, 's-Gravenhage (NL)

(72) Inventors: Andreas Mattheus Maria Moons, 's-Gravenhage (NL); Ellemieke Mary-Rose Henquet, 's-Gravenhage (NL); Bastiaan Knoll, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 251 days.

(21) Appl. No.: 14/636,901

(22) Filed: Mar. 3, 2015

(65) Prior Publication Data
US 2016/0256951 A1    Sep. 8, 2016

(51) Int. Cl.
*B23K 9/16* (2006.01)
*B23K 9/173* (2006.01)
(Continued)

(52) U.S. Cl.
CPC ............. *B23K 9/173* (2013.01); *B23K 9/295* (2013.01); *B23K 9/325* (2013.01)

(58) Field of Classification Search
CPC .......... B23K 9/173; B23K 9/23; B23K 9/295; B23K 9/29; B23K 9/32; B23K 9/325
See application file for complete search history.

(56) References Cited

U.S. PATENT DOCUMENTS 5,015,822 A * 5/1991 Mann ..................... B23K 9/32
219/137.41

FOREIGN PATENT DOCUMENTS

| GB | 2466254 A | 6/2010 |
|----|-----------|--------|
| WO | 91/07249 A1 | 5/1991 |
| WO | 00/61327 A1 | 10/2000 |

OTHER PUBLICATIONS

EP Search Report—EP 13181805.6—dated Feb. 5, 2014.

* cited by examiner

Primary Examiner — Brian Jennison
(74) Attorney, Agent, or Firm — Banner & Witcoff, Ltd.

(57) ABSTRACT

Welding torch system for use in welding or cutting operations during which fume is created. The welding torch system has a welding torch comprising a contact tip holder and a coaxial nozzle comprising an inner shield gas conduit having a shield gas outlet for supplying a shield gas. The inner shield gas conduit surrounds the contact tip holder. An outer shell at least partly surrounds said inner shield gas conduit. The welding torch system further comprises a shield gas generator and supply unit for supplying shield gas through the shield gas outlet and a fume extracting assembly for extracting fume and ambient air. The welding torch system is arranged for—during operation—supplying shield gas through the shield gas outlet at a velocity between about 1.5 m/s and 10 m/s. By operating the fume extracting assembly to generate a flow of between 10 and 100 m$^3$/h, preferably a flow of about 55 m$^3$/h a reduction in the area of 90%-95% of hazardous fumes can then be realized. A welding torch for use in such a system has an inner shield gas conduit having an end portion with an inner surface of which the diameter decreases towards the shield gas outlet. In a method for welding the shield gas is supplied through (Continued)

the shield gas outlet at a velocity between about 1.5 m/s and 10 m/s.

20 Claims, 7 Drawing Sheets

(51) Int. Cl.
    *B23K 9/29*           (2006.01)
    *B23K 9/32*           (2006.01)

WELDING TORCH SYSTEM FOR USE IN WELDING OR CUTTING OPERATIONS, WELDING TORCH FOR USE IN SUCH A WELDING TORCH SYSTEM AND METHOD FOR WELDING USING SUCH A WELDING TORCH SYSTEM OR SUCH A WELDING TORCH

Embodiments disclosed herein relate to a welding torch system for use in welding or cutting operations during which fume is created. According to some embodiments, a welding torch system includes a welding torch comprising:
  a contact tip holder having formed therein a longitudinal passageway with a head end through which can be supplied welding wire having a free end forming a contact tip;
  a coaxial nozzle comprising an inner shield gas conduit having a shield gas outlet for supplying a shield gas, said inner shield gas conduit surrounding said contact tip holder, an outer shell at least partly surrounding said inner shield gas conduit, said outer shell having a head end, wherein between an inner surface of said outer shell and an outer surface of said inner shield gas conduit a fume extracting passageway is formed and wherein a plurality of openings is provided in a distal end of the outer shell for extracting ambient air and fume into the coaxial nozzle;
  said welding torch system further comprising:
  a shield gas generator and supply unit operatively connectable to the inner shield gas conduit for—during operation—supplying shield gas through the shield gas outlet; and
  a fume extracting assembly operatively connectable to the fume extracting passageway for—during operation—extracting fume and ambient air.

Certain welding torch systems, for example as described in WO 91/07249, are constructed so as to extract fumes which are produced during electronic arc welding, and other welding methods as well, which fumes may be produced at appreciable volumes and may be potentially hazardous. In WO-91/07249 a nozzle structure for a fume extracting welding torch is described having a series of openings, generally in the form of transverse elongate slots, which for example can be in a surface of the nozzle tapering towards the downstream end of the torch. In a specific favorable embodiment of the known welding torch system the tapering portion is about 12.7 mm long and has a shield gas outlet with a diameter of about 22 mm. Four slots are provided in the tapering portion each extending for 4.8 mm inch in the longitudinal direction and for 14.6 mm in the transverse direction, with the upstream edge of slot being coincident with the commencement of the taper. Although this known welding torch system provides an improvement of the fume extraction, there still exists a need to further improve the fume extraction, preferably up to a level for which no protective gear for the welder is necessary during welding.

Embodiments described herein provide a welding torch system with which the fume extraction can be significantly improved while still providing the possibility of obtaining a correct weld.

Exemplary embodiments provide a welding torch system for use in welding or cutting operations during which fume is created, said welding torch system including a welding torch comprising:
  a contact tip holder having formed therein a longitudinal passageway with a head end through which can be supplied welding wire having a free end forming a contact tip;
  a coaxial nozzle comprising an inner shield gas conduit having a shield gas outlet for supplying a shield gas, said inner shield gas conduit surrounding said contact tip holder, an outer shell at least partly surrounding said inner shield gas conduit, said outer shell having a head end, wherein between an inner surface of said outer shell and an outer surface of said inner shield gas conduit a fume extracting passageway is formed and wherein a plurality of openings is provided in a distal end of the outer shell from extracting ambient air and fume into the coaxial nozzle; said welding torch system further comprising:
  a shield gas generator and supply unit operatively connectable to the inner shield gas conduit for—during operation—supplying shield gas through the shield gas outlet; and
  a fume extracting assembly operatively connectable to the fume extracting passageway for—during operation—extracting fume and ambient air;
  characterized in that the welding torch system is arranged for—during operation—supplying shield gas through the shield gas outlet at a velocity between about 1.5 m/s and 10 m/s. Certain embodiments are based on the insight that the velocity with which the shield gas is discharged from the shield gas outlet to be supplied to the contact tip for protecting the weld surprisingly is a determining factor for the effectiveness of fume extraction. It appears that in all the welding torch systems known to the applicant the velocity of the shield gas is approximately 0.8-1.0 m/s. Even if the nozzle structure of WO-91/07249, or an alternative nozzle structure, is used it appears that in order to obtaining a correct weld the extraction of fumes is not effective enough (less than 50% reduction) and that hazardous fumes are still spread away from the torch towards the welder. According to some embodiments, increasing the outlet velocity to between about 1.5 m/s and 10 m/s it is possible to adapt the welding torch system such that hazardous fumes are extracted more effectively. Preferably the welding torch system is arranged for—during operation—reducing hazardous fumes by at least 90%-95%.

In an embodiment of a welding torch system, the welding torch system is arranged for—during operation—supplying shield gas through the shield gas outlet at a velocity between about 2.8 m/s and 5 m/s, preferably between 3.0 and 3.8 m/s. In this manner correct welds can be obtained while using a relatively low amount of energy and amount of shield gas, while providing the possibility to extract hazardous fumes with a good efficiency.

In an embodiment of a welding torch system, the increased outlet velocity of shield gas is obtained by accordingly operating and arranging the shield gas generator and supply unit.

In order to reduce costs for operating the welding torch system it is in an alternative embodiment of a welding torch system advantageous when the inner shield gas conduit has an end portion having an inner surface of which the diameter decreases towards the shield gas outlet. In this manner the narrowing of the inner shield gas conduit towards the shield gas outlet provides the increased outlet velocity, so that the commonly used shield gas generator and supply unit nor the operation thereof need not be adapted. It is then in particular advantageous when the inner surface of the end portion is configured for—during operation—generating a substantially undisturbed flow of shield gas or preferably a substantially laminar flow. Such an undisturbed flow of shield gas does not give rise to turbulence which undisturbed flow can promote the extraction of fumes while obtaining a correct weld. Preferably the inner surface of the end portion then decreases gradually. In particular it can be useful that the inner surface is free of ridges, grooves or steps in order to prevent sudden pressure drops. In case the end portion of the inner shield gas conduit has a length of at least 25 mm it is possible to obtain an undisturbed flow of shield gas as well as an increased outlet velocity in a range of preferably 3.0 to 3.8 m/s in an constructional simple manner.

In a further embodiment of a welding torch system, the end portion of the inner shield gas conduit is conical, preferably having a uniform wall thickness as a result of which the outer surface of the inner shield gas conduit is also conical, which makes it possible to construct the coaxial nozzle in an easy manner.

It appears that in case the shield gas outlet has a diameter between 8 and 12 mm, preferably a diameter of about 10 mm, in most cases the increased outlet velocity can be realized without making further adaptations to the welding torch system.

In order to prevent deterioration of the inner shield gas conduit due to the heat generated during welding, the wall thickness of the inner shield gas conduit is preferably dimensioned for—during operation—conducting heat generated during welding at an amount sufficient to prevent deterioration of the conical end portion, said wall thickness preferably being at least 1 mm, more preferred at least 1.5 mm.

In an advantageous embodiment of a welding torch system, the contact tip holder has a conical end portion having an outer surface with a diameter which decreases towards the head end. This aspect is based on the insight that by shaping the contact tip holder in this manner it can be possible to realize the increased outlet velocity of the shield gas in a constructionally easy manner. When the distance between the outer surface of the conical end portion of the contact tip holder and the inner surface of the conical end portion of the inner shield gas conduit is at least substantially uniform in longitudinal direction obtaining an undisturbed flow of shield gas can be relatively easy.

In a further embodiment of a welding torch system, the head end of the contact tip holder has a diameter of less than 5 mm, preferably a diameter of 4.0 mm, as a result of which deposition of contaminations on the free end surface of the contact tip holder can be prevented.

To realize a correct weld the distance in longitudinal direction between the head end of the contact tip holder and a plane defined by the shield gas outlet of the inner shield gas conduit is—in accordance with a further embodiment of a welding torch system—less than 5 mm, preferably less than 4 mm, most preferred about 3 mm.

In a still further embodiment of a welding torch system, the outer shell has an end portion having an inner surface with a diameter which decreases towards the head end of the end portion of the outer shell. Preferably the end portion of the outer shell is at least 25 mm long. In this manner the extraction of fumes can be promoted. Preferably, the distance between an outer surface of the end portion of the inner shield gas conduit and the inner surface of the end portion of the outer shell decreases towards the head end, which means that the rate at which the diameter of the inner surface of the outer shell decreases is greater than that the rate at which the outer surface of the inner shield gas conduit decreases in diameter. This in particular can promote the extraction of fumes, which is even further promoted when the end portion of the outer shell is conical, preferably having a uniform wall thickness. Preferably, the outer shell is also conical with a decreasing diameter towards the head end which—during use—provides a better sight on the material to be welded/cut.

From a point of construction of the welding torch of the welding torch system it is advantageous when the head end of the outer shell and the head end of the inner shield gas conduit are integral or when the outer shell and the inner shield gas conduit are formed by separate parts which are welded together at their head ends for forming an integral head end.

Preferably the plurality of openings in the distal end of the outer shell are formed by a number of longitudinally extending slots, each slot communicating with the fume extracting passageway, which slots are distributed evenly in circumferential direction of the outer shell. Since the slots extend in longitudinal direction the extraction of fumes can be realized in an effective manner, in particular when the slots have a length of at least 20, preferably at least 22 mm, most preferred a length of about 26 mm.

In a particularly advantageous embodiment of a welding torch system, the slots extend from the portion of the outer shell where the inner surface has the largest diameter up to an operating distance from the distal end of the head end of the outer shell. In this manner it can be realized that the extraction of fumes does not influence the outflow of shield gas exiting from the shield gas outlet so that the weld is correctly shielded. In particular the operating distance is chosen as small as possible while not disturbing the shield gas and is preferably at least 3 mm, preferably at least 4 mm, most preferred about 5 mm.

In an embodiment of a welding torch system in which the effective passage area of all the slots is equal to or greater than the effective passage area of the fume extracting passageway, the fume extracting passageway does not form a restriction for the extracted fumes which can lead to an improved extraction of fumes.

In a specific embodiment of a welding torch system, the fume extracting assembly is arranged for—during operation—generating a flow of between 10 and 100 $m^3/h$, preferably between 50 and 75 $m^3/h$, most preferred a flow of about 55 $m^3/h$. In this manner a good extraction of fumes can be realized without interfering with the flow of shield gas exiting the shield gas outlet. In particular, it has appeared that with a flow having a value above this range also shield gas exiting from the shield gas outlet is influenced and drawn backwards which could deteriorate the quality of the weld, while when the flow has a value below this range fumes are insufficiently extracted. In an embodiment of a welding torch system, wherein the fume extracting assembly is arranged for—during operation—generating a flow with such a value and the operating distance is chosen such for—during operation—creating a circumferential lee zone around the distal end of the outer shell in which substantially no extraction force is exerted on the fume it is possible that the amount of fumes extracted is such that the protection for the welder can be minimal or even be dispensed with totally.

Some embodiments further relate to a welding torch for use in a welding torch system, wherein the welding torch comprises:
  a contact tip holder having formed therein a longitudinal passageway with a head end through which can be supplied welding wire having a free end forming a contact tip;

a coaxial nozzle comprising an inner shield gas conduit having a shield gas outlet for supplying a shield gas, said inner shield gas conduit surrounding said contact tip holder, an outer shell at least partly surrounding said inner shield gas conduit, said outer shell having a head end, wherein between an inner surface of said outer shell and an outer surface of said inner shield gas conduit a fume extracting passageway is formed and wherein a plurality of openings is provided in a distal end of the outer shell for extracting ambient air and fume into the coaxial nozzle;

characterized in that the inner shield gas conduit has an end portion having an inner surface of which the diameter decreases towards the shield gas outlet. For reasons of redundancy the advantages obtained by the welding torch or by the specific embodiments thereof which are listed below, are not mentioned again here, but reference is made to the respective statements made above with reference to the welding torch system. The diameter of the inner surface of the end portion preferably decreases gradually. In an embodiment of a representative welding torch the end portion of the inner shield gas conduit is conical, preferably having a uniform wall thickness. The shield gas outlet preferably has a diameter between 8 and 12 mm, preferably a diameter of about 10 mm. The wall thickness of the inner shield gas conduit in particular is at least 1 mm, preferably at least 1.5 mm. In a further embodiment of a representative welding torch the contact tip holder has a conical end portion having an outer surface with a diameter which decreases towards the head end, wherein preferably the distance between the outer surface of the conical end portion of the contact tip holder and the inner surface of the conical end portion of the inner shield gas conduit is at least substantially uniform in longitudinal direction. The head end of the contact tip holder has a diameter of less than 5 mm, preferably a diameter of 4.0 mm in order to be able to prevent deposition of contaminations during welding. Preferably the distance in longitudinal direction between the head end of the contact tip holder and a plane defined by the shield gas outlet of the inner shield gas conduit is less than 5 mm, preferably less than 4 mm, most preferred about 3 mm.

The outer shell of an embodiment of a welding torch has an end portion having an inner surface with a diameter which decreases towards the head end of the distal end of the outer shell. In particular the distance between an outer surface of the end portion of the inner shield gas conduit and the inner surface of the end portion of the outer shell decreases towards the head end. Preferably, the end portion of the outer shell is conical, preferably having a uniform wall thickness. The head end of the outer shell and the head end of the inner shield gas conduit can be made integral or can be formed by separate parts which are welded together at their head ends for forming an integral head end. The outer shell preferably is provided with a number of longitudinally extending slots, each slot communicating with the fume extracting passageway, which slots are distributed evenly in circumferential direction of the outer shell. The slots can in an advantageous embodiment extend from the portion of the outer shell where the inner surface has the largest diameter up to an operating distance from the distal end of the head end of the outer shell, wherein the operating distance is at least 3 mm, preferably at least 4 mm, most preferred at least 5 mm. The effective passage area of all the slots is advantageously equal to the effective passage area of the fume extracting passageway.

Embodiments further relate to a method for welding using a welding torch system as described herein or using a welding torch as described herein, wherein the method comprises during welding the steps of:

supplying shield gas through the shield gas outlet by operating the shield gas generator and supply unit; and
extracting fume and ambient air by operating the fume extracting assembly;

characterized in that the shield gas is supplied through the shield gas outlet at a velocity between about 1.5 m/s and 10 m/s. By generating a shield gas which passes the shield gas outlet with an increased outlet velocity between about 1.5 m/s and 10 m/s it can be possible to correctly perform welding while hazardous fumes are extracted more effectively. In particular shield gas is supplied through the shield gas outlet at a velocity between about 2.8 m/s and 5 m/s, preferably between 3.0 and 3.8 m/s. Preferably an embodiment of the method comprises the step of generating an undisturbed flow of shield gas through the shield gas outlet.

In a further embodiment of a method for welding, a flow of between 10 and 100 $m^3/h$, preferably between 50 and 75 $m^3/h$, most preferred a flow of about 55 $m^3/h$ is generated by operating the fume extracting assembly such that fumes can be extracted efficiently without negatively influencing the function of the shield gas.

In a particularly advantageous embodiment of a method for welding, the fume extracting assembly is operated such as to generate a flow with such a value while choosing the operating distance such that a circumferential lee zone is created around the distal end of the outer shell in which substantially no extraction force is exerted on the fume. In this manner it is possible that the amount of fumes extracted is such that the protection for the welder can be minimal or even be dispensed with totally.

These and other aspects will become more apparent from the following detailed description of an exemplary embodiment of a welding torch system and welding torch, taken in conjunction with the accompanying drawings.

Figure 1:
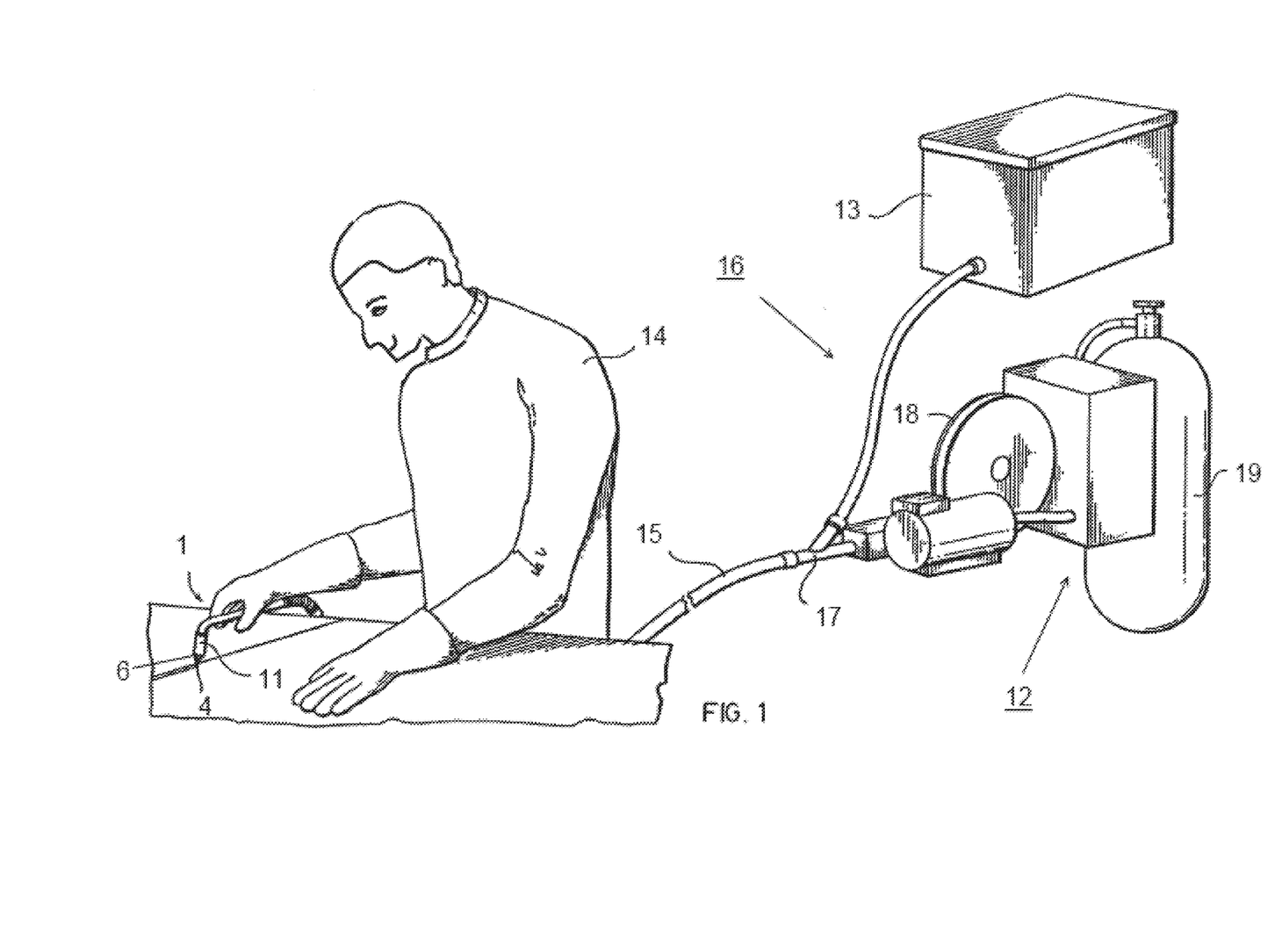
FIG. 1 illustrates schematically an exemplary embodiment of a welding torch system for use in welding or cutting operations.
Figure 2:
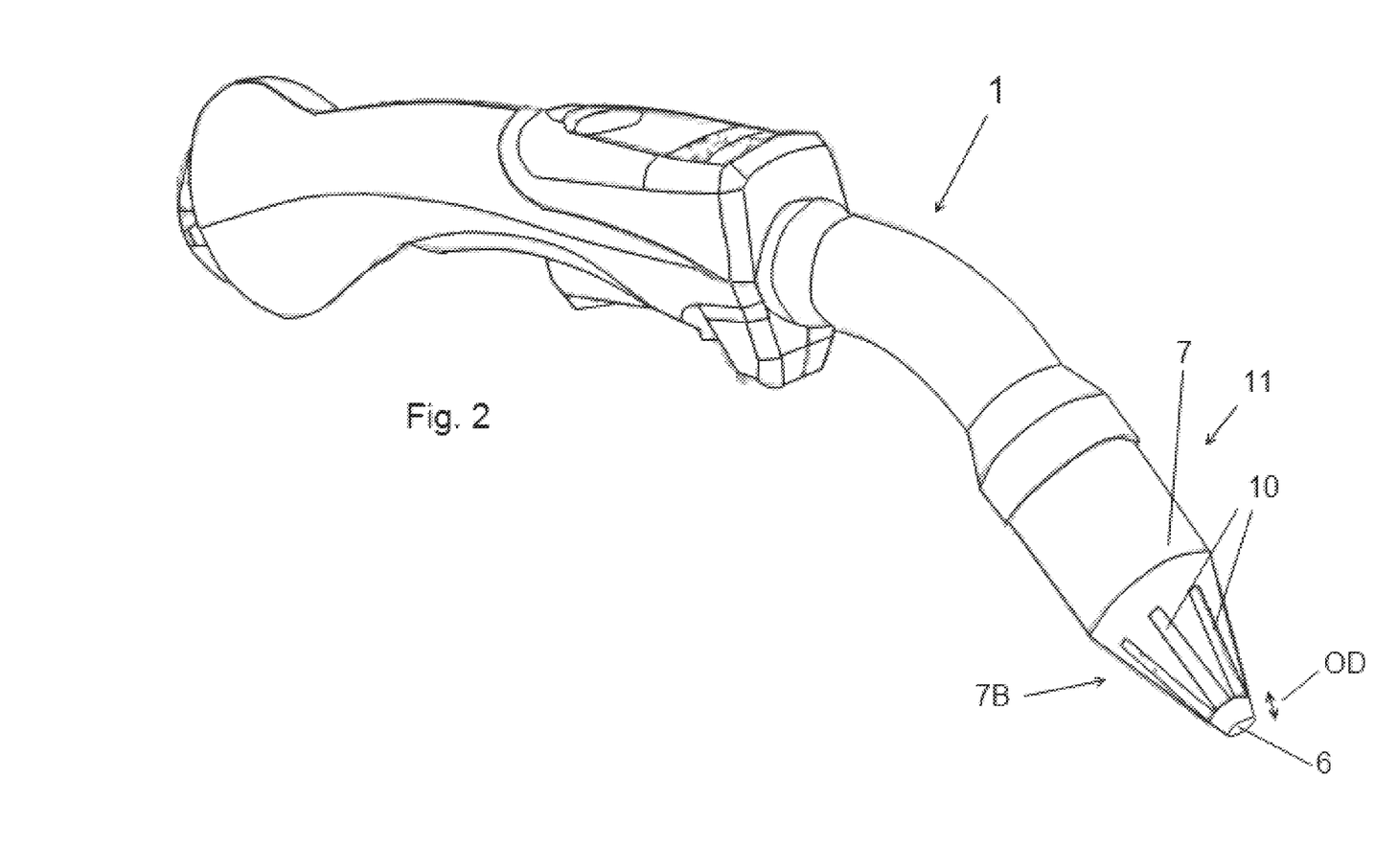
FIG. 2 schematically illustrates a welding torch in perspective.

Referring to the drawings, FIG. 1 illustrates schematically an exemplary embodiment of a welding torch system for use in welding or cutting operations. The system comprises a welding torch 1 including a nozzle 11 and a shield gas outlet 6, a control handle portion gripped by a welder 14 during operation, a flexible connector hose portion 15 which leads from the welding torch 1 to a services supply station 16. The flexible connector hose 15 terminates in an adaptor 17 which communicates with a fume extracting assembly 13, e.g. comprising a vacuum pump. The vacuum pump applies a vacuum to the interior of the hose 15 to remove fumes and smoke from adjacent the weld site at the nozzle 11 of the welding torch 1, and is arranged for—during operation—generating a flow of about 55 m³/h, or in general of between 10 and 100 m³/h, preferably between 50 and 75 m³/h.

The service supply station 16 further comprises a consumable welding wire feeding mechanism 18 which includes a reel of welding wire 4, and a shield gas generator and supply unit 12 with a source of shield or inert gas 19 for providing shield gas at the welding tip.

Figure 3:
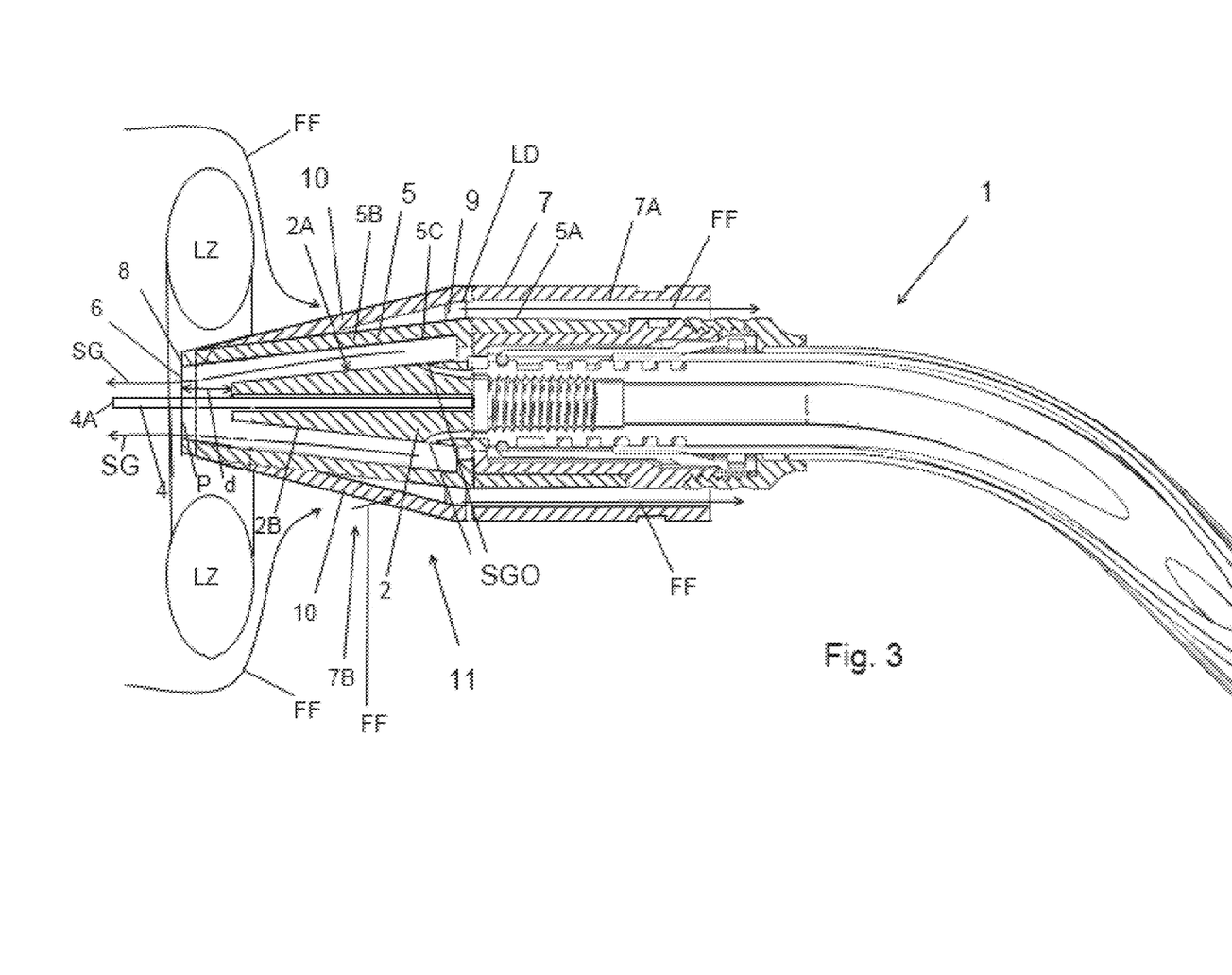
FIG. 3 schematically illustrates the welding torch of FIG. 2 in cross section.
Figure 4:
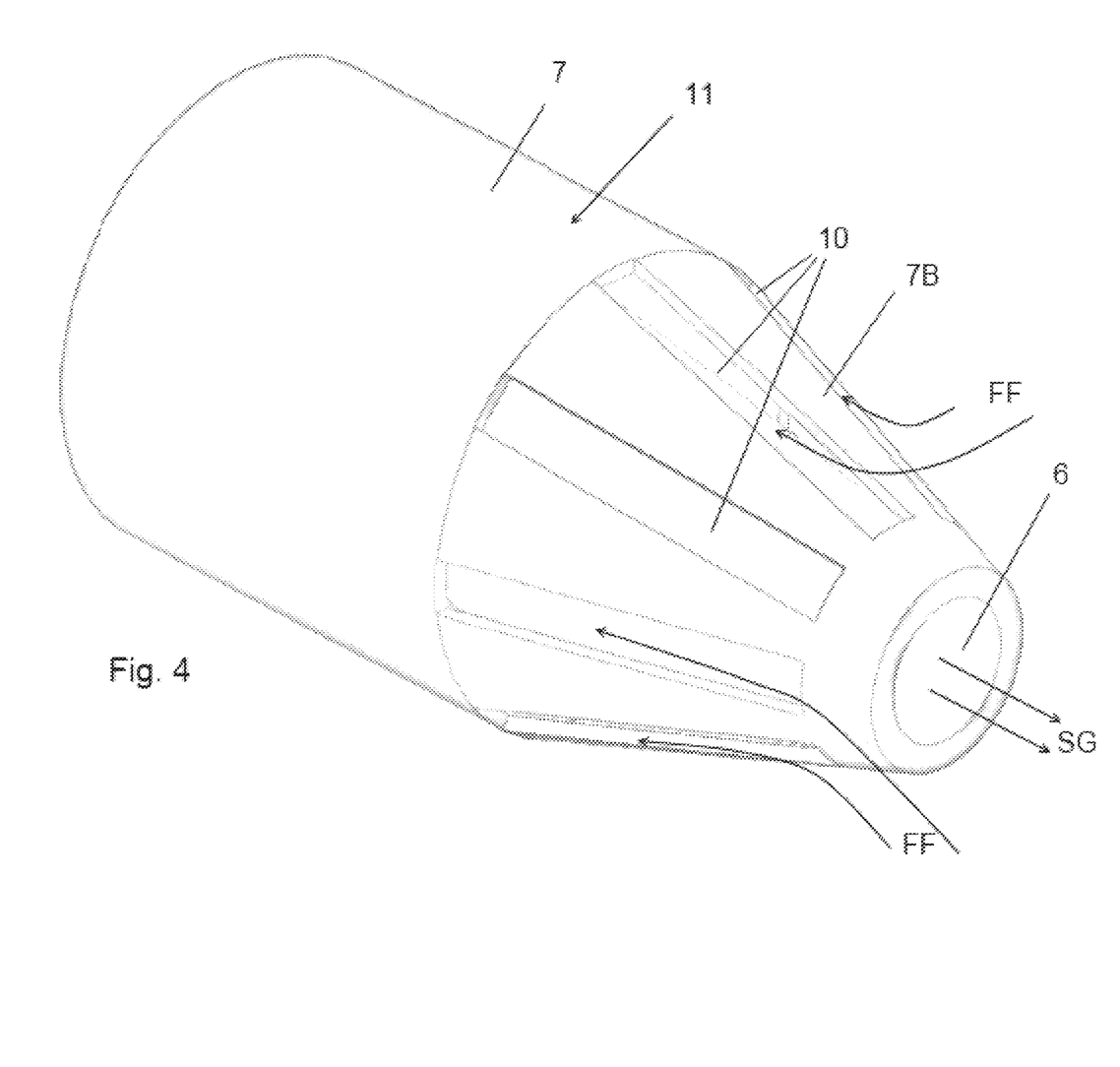
FIG. 4 schematically illustrates the nozzle of the welding torch of FIGS. 2 and 3 in perspective.
Figure 5:
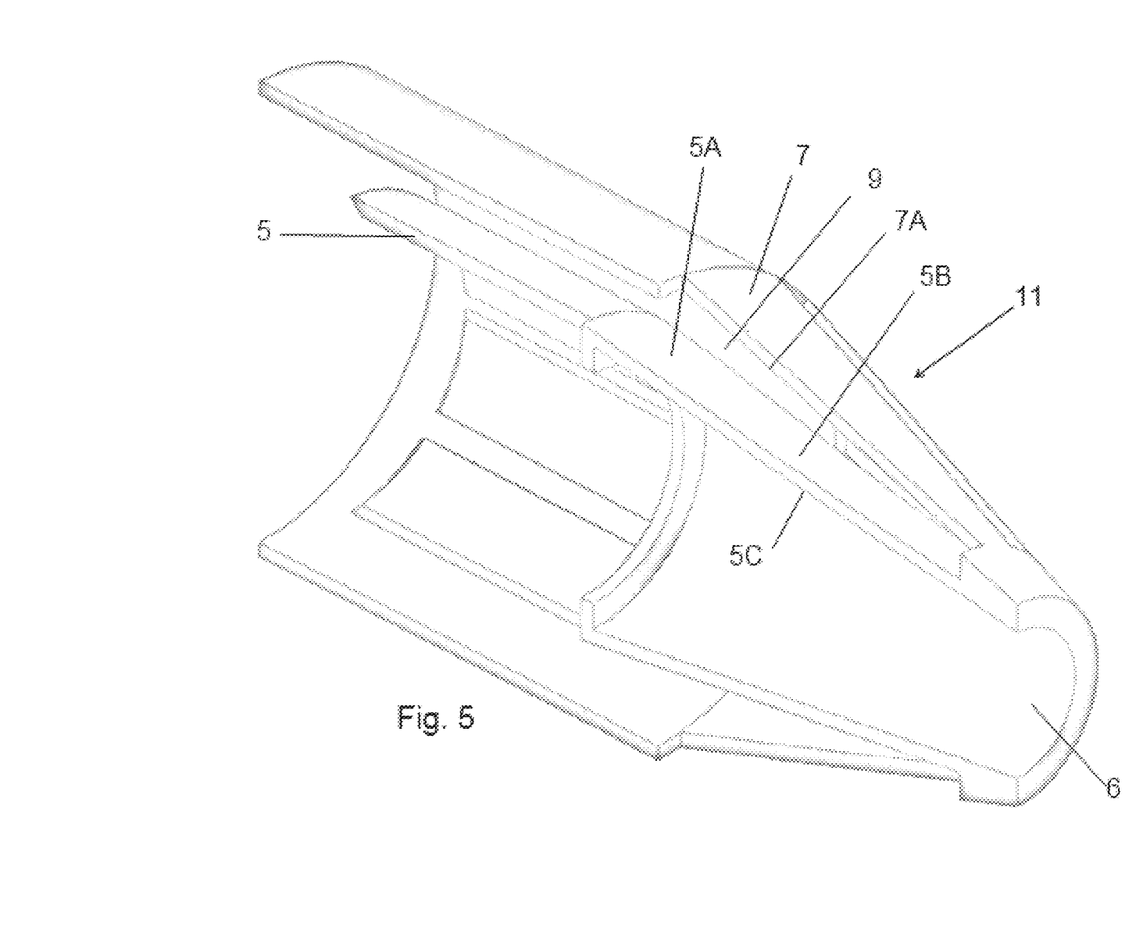
FIG. 5 schematically illustrates the nozzle of FIG. 4 partly broken away.

The welding torch 1 comprises a contact tip holder 2 having formed therein a longitudinal passageway 3 with a head end 3A through which can be supplied the welding wire 4 which has a free end 4A forming a contact tip for welding or cutting (FIG. 3). The coaxial nozzle 11 comprises an inner shield gas conduit 5 which has a shield gas outlet 6 for supplying a shield gas SG coming from the shield gas generator and supply unit 12 via contact tip holder shield gas outlets SGO in the contact tip holder 2. The inner shield gas conduit 5 surrounds the contact tip holder 2.

An outer shell 7 at least partly surrounds the inner shield gas conduit 5 and has a head end 8. As can be seen in FIG. 3 between an inner surface 7A of the outer shell 7 and an outer surface 5A of the inner shield gas conduit 5 a fume extracting passageway 9 is formed which via the hose 15 (FIG. 1) is connected to the fume extracting assembly 13. A plurality of openings 10 is provided in a distal end 7B of the outer shell for extracting ambient air and fume FF into the coaxial nozzle 11.

The inner shield gas conduit 5 has an end portion 5B having an inner surface 5C of which the diameter decreases towards the shield gas outlet 6, as can be clearly seen in any of the FIGS. 3 to 7. In the embodiment shown in FIG. 7 the shield gas outlet 6 has a diameter of 10 mm, but in other embodiments the diameter can be between 8 and 12 mm, preferably a diameter of about 10 mm. The nozzle 11 is configured such that the distance between the outer surface 2B of the conical end portion 2A of the contact tip holder 2 and the inner surface 5C of the conical end portion 5B of the inner shield gas conduit 5 is at least substantially uniform in longitudinal direction, which can lead to an undisturbed flow of shield gas towards and through the shield gas outlet 6.

The distance d in longitudinal direction between the head end 3A of the contact tip holder 2 and a plane P defined by the shield gas outlet 6 of the inner shield gas conduit 5 is in the embodiment shown in FIG. 3 about 3 mm, but can in other embodiments be less than 5 mm, preferably less than 4 mm. In the embodiment shown in the Figures the welding torch 1 comprises eight longitudinally extending slots 10 which are distributed evenly in circumferential direction of the outer shell 7. Each slot 10 communicates with the fume extracting passageway 9, so that—during operation—a flow of fumes FF can be drawn into the slots 10 and transported to the fume extracting assembly 13.

Figure 6:
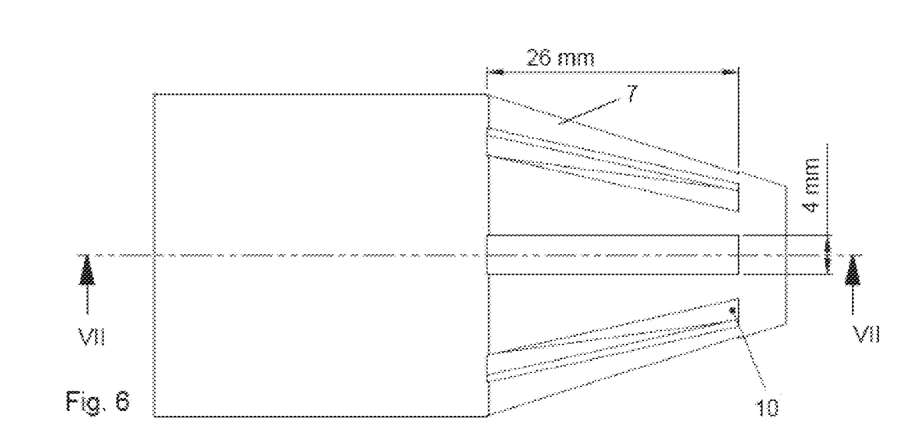
FIG. 6 schematically illustrates the nozzle of FIGS. 4 and 5 in side view.
Figure 7:
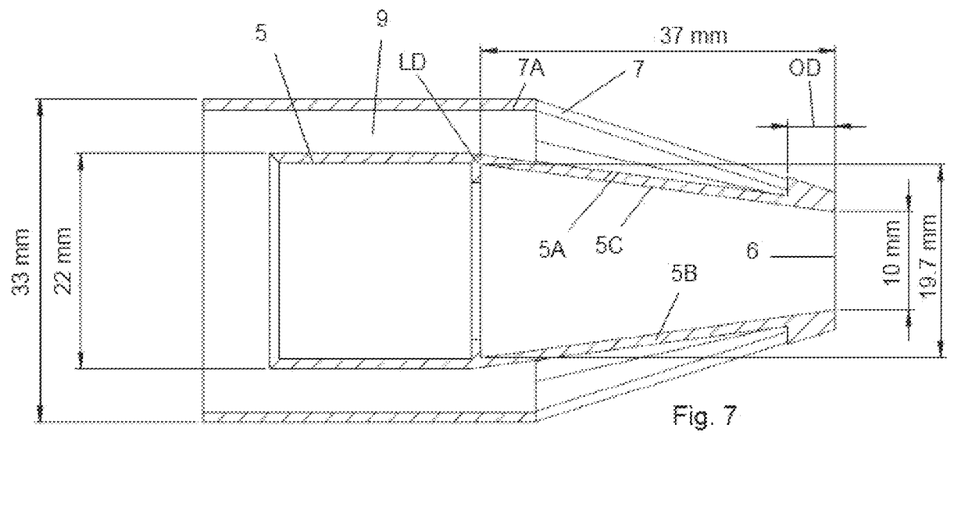
FIG. 7 schematically illustrates the nozzle of FIG. 6 in cross section.

With this configuration of the welding torch 1 and the dimensions shown in FIGS. 6 and 7 the welding torch supplies—during operation—shield gas through the shield gas outlet 6 at a velocity of about 3.5 m/s. Please note that in other not-shown embodiments the configuration and dimensions can be adapted to obtain a velocity of shield gas between about 1.5 m/s and 10 m/s, preferably between about 2.8 m/s and 5 m/s and most preferred between 3.0 and 3.8 m/s.

Figure 8:
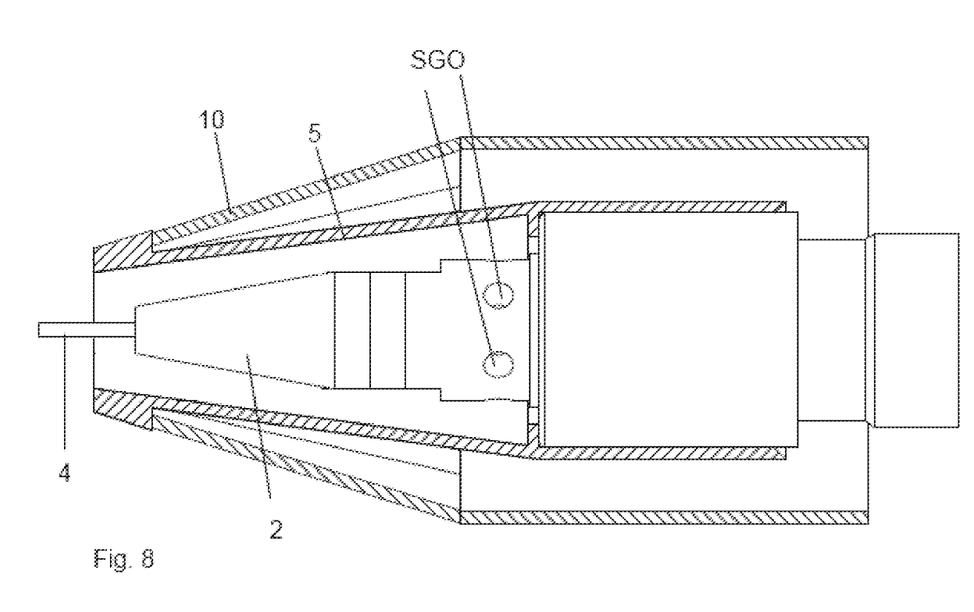
FIG. 8 schematically shows the nozzle with contact tip holder partly in cross section of the welding torch shown in FIG. 3.

In the embodiment shown in FIGS. 6 and 7 each slot is rectangular and has a length (projected in longitudinal direction) of 26 mm and a width of 4 mm. The inner surface 7A of the distal end 7B of the outer shell 7 has a diameter which decreases towards the head end 8 of the distal end (7B) of the outer shell 7, so that the slots 10 extend from the portion LD of the outer shell 7 where the inner surface 7A has the largest diameter, in the shown embodiment 19.7 mm, to an operating distance OD from the distal end 7B of the head end 8 of the outer shell 7, which in the shown embodiment is about 5 mm. The length of the inner shield gas conduit 5 from the position LD where the inner diameter of the inner shield gas conduit 5 starts to decrease up to the head end is in the shown embodiment 37 mm. This ensures that a lee zone is developed adjacent and around the head end. Please note that in other embodiments the operating distance OD can be at least 3 mm. The contact tip holder is not shown in FIGS. 6 and 7 in order to make the drawing mare clear, however the contact tip holder mounted in the nozzle is shown in FIG. 3 and FIG. 8. The head end of the contact tip holder has—in this embodiment—a diameter of about 4.0 mm. The contact tip holder is conically shaped such that the distance in transverse direction between the outer surface of the tip holder and the inner surface of the inner shield gas conduit is substantially constant up to the tip end of the contact tip holder.

The end portion of the inner shield gas conduit has a uniform wall thickness of about 1.65 mm, which leads to an outer diameter of the inner shield gas conduit before the inner diameter starts to decrease of 22 mm. In the shown embodiment the outer shell has an outer diameter of 33 mm before the inner diameter thereof starts to decrease at a position 26 mm from the head end. The outer shell also has a uniform wall thickness of 1.65 mm. In order to prevent deterioration of the inner shield gas conduit due to the heat generated during welding, the wall thickness can in other embodiments be at least 1 mm, more preferred at least 1.5 mm.

The fume extracting assembly 13 is arranged for—during operation—generating a flow FF with such a value and the operating distance OD is chosen such that—during operation—the circumferential lee zone LZ is created and maintained around the distal end 7B of the outer shell 7 in which substantially no extraction force is exerted on fume. This lee zone LZ thus protects the weld site from the underpressure created by the fume extracting assembly 13.

The invention claimed is:

1. Welding torch system for use in welding or cutting operations during which fume is created, said welding torch system including a welding torch comprising:
a contact tip holder having formed therein a longitudinal passageway with a head end through which can be supplied welding wire having a free end forming a contact tip;
a coaxial nozzle comprising an inner shield gas conduit having a shield gas outlet for supplying a shield gas, said inner shield gas conduit surrounding said contact tip holder, an outer shell at least partly surrounding said inner shield gas conduit, said outer shell having a head end, wherein between an inner surface of said outer shell and an outer surface of said inner shield gas conduit a fume extracting passageway is formed and wherein a plurality of openings is provided in a distal end of the outer shell for extracting ambient air and fume into the coaxial nozzle;
said welding torch system further comprising:
a shield gas generator and supply unit operatively connectable to the inner shield gas conduit for—during operation—supplying shield gas through the shield gas outlet; and a fume extracting assembly operatively connectable to the fume extracting passageway for—during operation—extracting fume and ambient air;

wherein the welding torch system is arranged for—during operation—supplying shield gas through the shield gas outlet at a velocity between about 1.5 m/s and 10 m/s;

and wherein the outer shell is provided with a number of longitudinally extending slots, each slot communicating with the fume extracting passageway, which slots are distributed evenly in circumferential direction of the outer shell.

2. Welding torch system according to claim 1, wherein the inner shield gas conduit has an end portion having an inner surface of which the diameter decreases towards the shield gas outlet.

3. Welding torch system according to claim 2, wherein the inner surface of the end portion is configured for—during operation—generating an undisturbed flow of shield gas.

4. Welding torch system according to claim 1, wherein the shield gas outlet has a diameter between 8 and 12 mm.

5. Welding torch system according to claim 1, wherein the contact tip holder has a conical end portion having an outer surface with a diameter which decreases towards the head end.

6. Welding torch system according to claim 2, wherein the distance between the outer surface of the conical end portion of the contact tip holder and the inner surface of the conical end portion of the inner shield gas conduit is uniform in longitudinal direction.

7. Welding torch system according to claim 1, wherein the distance in longitudinal direction between the head end of the contact tip holder and a plane defined by the shield gas outlet of the inner shield gas conduit is less than 5 mm.

8. Welding torch system according to claim 1, wherein the inner surface of the distal end of the outer shell has a diameter which decreases towards the head end of the distal end of the outer shell and wherein the slots extend from the portion of the outer shell where the inner surface has the largest diameter up to an operating distance from the distal end of the head end of the outer shell.

9. Welding torch system according to claim 8, wherein the operating distance is at least 3 mm.

10. Welding torch system according to claim 1, wherein the fume extracting assembly is arranged for—during operation—generating a flow of between 10 and 100 m$^3$/h.

11. Welding torch system according to claim 8, wherein the fume extracting assembly is arranged for—during operation—generating a flow with such a value and the operating distance is chosen such for—during operation—creating a circumferential lee zone around the distal end of the outer shell in which no extraction force is exerted on fume.

12. Welding torch system according to claim 1, wherein the welding torch system is arranged for—during operation—reducing hazardous fumes by at least 90%-95%.

13. Welding torch for use in a welding torch system according to claim 1, wherein the welding torch comprises:
a contact tip holder having formed therein a longitudinal passageway with a head end through which can be supplied welding wire having a free end forming a contact tip;
a coaxial nozzle comprising an inner shield gas conduit having a shield gas outlet for supplying a shield gas, said inner shield gas conduit surrounding said contact tip holder, an outer shell at least partly surrounding said inner shield gas conduit, said outer shell having a head end, wherein between an inner surface of said outer shell and an outer surface of said inner shield gas conduit a fume extracting passageway is formed and wherein a plurality of openings are provided in a distal end of the outer shell for extracting ambient air and fume into the coaxial nozzle;
wherein the inner shield gas conduit has an end portion having an inner surface of which the diameter decreases towards the shield gas outlet.

14. Welding torch according to claim 13, wherein the shield gas outlet has a diameter between 8 and 12 mm.

15. Welding torch according to claim 13, wherein the outer shell is provided with a number of longitudinally extending slots, each slot communicating with the fume extracting passageway, which slots are distributed evenly in circumferential direction of the outer shell.

16. Welding torch according to claim 15, wherein the inner surface of the distal end of the outer shell has a diameter which decreases towards the head end of the distal end of the outer shell and wherein the slots extend from the portion of the outer shell where the inner surface has the largest diameter up to an operating distance from the distal end of the head end of the outer shell.

17. Welding torch according to claim 16, wherein the operating distance (OD) is at least 3 mm.

18. Method for welding using a welding torch system according to claim 1, wherein the method comprises during welding the steps of:
supplying shield gas through the shield gas outlet by operating the shield gas generator and supply unit; and
extracting fume and ambient air by operating the fume extracting assembly;
wherein the shield gas is supplied through the shield gas outlet at a velocity between about 1.5 m/s and 10 m/s, and
wherein the outer shell is provided with a number of longitudinally extending slots, each slot communicating with the fume extracting passageway, which slots are distributed evenly in circumferential direction of the outer shell, wherein the inner surface of the distal end of the outer shell has a diameter which decreases towards the head end of the distal end of the outer shell and wherein the slots extend from the portion of the outer shell where the inner surface has the largest diameter up to an operating distance from the distal end of the head end of the outer shell, and wherein by operating the fume extracting assembly a flow is generated with such a value and the operating distance is chosen to be at least 3 mm such that a circumferential lee zone is created around the distal end of the outer shell in which no extraction force is exerted on fume.

19. Method for welding according to claim 18, wherein a flow of between 10 and 100 m$^3$/h is generated by operating the fume extracting assembly.

20. Method for welding according to claim 18, wherein the amount of hazardous fumes is reduced by at least 90%-95%.

* * * * *